(12) United States Patent
Reinking

(10) Patent No.: US 9,388,601 B2
(45) Date of Patent: Jul. 12, 2016

(54) UNITARY CONSTRUCTION MICRO CAMPER WITH INTEGRATED CLIMATE CONTROL SYSTEM

(71) Applicant: Frederick Joseph Reinking, Austin, TX (US)

(72) Inventor: Frederick Joseph Reinking, Austin, TX (US)

( * ) Notice: Subject to any disclaimer, the term of this patent is extended or adjusted under 35 U.S.C. 154(b) by 0 days.

(21) Appl. No.: 14/856,291

(22) Filed: Sep. 16, 2015

(65) Prior Publication Data

US 2016/0076271 A1  Mar. 17, 2016

Related U.S. Application Data

(60) Provisional application No. 62/051,056, filed on Sep. 16, 2014.

(51) Int. Cl.
| | |
|---|---|
| *E04H 15/10* | (2006.01) |
| *E04H 15/14* | (2006.01) |
| *F25D 3/06* | (2006.01) |
| *B60H 1/32* | (2006.01) |

(52) U.S. Cl.
CPC ............. *E04H 15/10* (2013.01); *E04H 15/14* (2013.01); *B60H 1/3202* (2013.01); *F25D 3/06* (2013.01)

(58) Field of Classification Search
CPC ......... E04H 15/10; E04H 15/12; E04H 15/14; E04H 15/18; B60H 1/3202; F25D 3/06
See application file for complete search history.

(56) References Cited

U.S. PATENT DOCUMENTS

| | | | |
|---|---|---|---|
| 2,793,015 A | | 5/1957 | Thompson |
| 3,553,911 A | * | 1/1971 | Morrow .................... E04H 1/12 454/251 |

(Continued)

FOREIGN PATENT DOCUMENTS

| | | |
|---|---|---|
| EP | 1107903 B1 | 4/2004 |
| EP | 1502785 A1 | 2/2005 |

OTHER PUBLICATIONS

Teardrops N Tiny Travel Trailers, Discussion Post Small air conditioning unit; Retrived from http://www.tnttt.com/viewtopic.php?t=35925&p=677635, Sep. 13, 2015.

*Primary Examiner* — Rodney Mintz
(74) *Attorney, Agent, or Firm* — Craige Thompson; Thompson Patent Law

(57) ABSTRACT

Apparatus and associated methods relate to a unitary cabin body having a utility compartment and a laterally adjacent personal compartment, the utility compartment forming a water reservoir in controlled, gravity-fed fluid communication with a climate control compartment, and a laterally directed outlet providing fluid communication from the climate control compartment to the personal compartment. In an illustrative example, the climate control compartment may be integrally formed to provide an evaporative cooling compartment and a plenum compartment. A float valve may regulate fluid communication from the water reservoir to the evaporative cooling compartment, for example. In various embodiments, a unitary roof body may engage the unitary cabin body in a stowed mode for transport, for example, and be raised above the unitary body in a deployed mode for occupancy.

20 Claims, 7 Drawing Sheets

(56) References Cited

U.S. PATENT DOCUMENTS

| | | | | |
|---|---|---|---|---|
| 3,923,134 A * | 12/1975 | Rezazadeh | G07F 5/18 | |
| | | | 194/241 | |
| 4,243,260 A * | 1/1981 | Gieseking | B60P 3/32 | |
| | | | 296/24.33 | |
| 4,395,785 A * | 8/1983 | Huh | E04H 1/12 | |
| | | | 312/237 | |
| 4,505,078 A * | 3/1985 | Huh | E04H 1/1205 | |
| | | | 312/242 | |
| D279,944 S * | 8/1985 | McLaren | D30/108 | |
| 4,550,457 A * | 11/1985 | Dukkers | A47C 21/00 | |
| | | | 5/414 | |
| 4,594,817 A * | 6/1986 | McLaren | E04H 1/125 | |
| | | | 5/2.1 | |
| 4,745,643 A * | 5/1988 | Clarke | A47C 19/202 | |
| | | | 114/192 | |
| 4,798,060 A | 1/1989 | Long et al. | | |
| 4,987,706 A * | 1/1991 | Hughes | E04H 1/125 | |
| | | | 52/143 | |
| 5,168,722 A | 12/1992 | Brock | | |
| 5,560,219 A * | 10/1996 | Vegara | B60H 1/3235 | |
| | | | 62/241 | |
| 5,661,984 A * | 9/1997 | Durrell | B60H 1/3202 | |
| | | | 261/DIG. 41 | |
| 5,715,698 A * | 2/1998 | Calton | F24F 6/043 | |
| | | | 62/309 | |
| 5,857,350 A * | 1/1999 | Johnson | F24F 5/0035 | |
| | | | 261/106 | |
| 6,101,831 A * | 8/2000 | Ciccone | F24F 5/0035 | |
| | | | 62/310 | |
| 6,467,221 B1 * | 10/2002 | Bigelow | B64D 11/00 | |
| | | | 244/171.9 | |
| 6,585,751 B1 * | 7/2003 | Silverman | A61N 5/06 | |
| | | | 607/88 | |
| 6,817,206 B2 * | 11/2004 | Shahbaz | F24F 3/14 | |
| | | | 62/305 | |
| 6,981,347 B1 * | 1/2006 | Walburger | E04H 3/02 | |
| | | | 52/34 | |
| 7,178,357 B2 * | 2/2007 | Link | B60H 1/00264 | |
| | | | 62/440 | |
| 7,488,030 B2 | 2/2009 | Nadeau | | |
| 7,805,958 B2 * | 10/2010 | Bratcher | B62B 9/00 | |
| | | | 62/420 | |
| D664,667 S * | 7/2012 | Krymov | D25/16 | |
| 8,276,223 B1 * | 10/2012 | Connor | A47C 21/00 | |
| | | | 135/124 | |
| 8,302,421 B2 * | 11/2012 | Korytnikov | F24F 5/0035 | |
| | | | 165/60 | |
| 8,407,835 B1 * | 4/2013 | Connor | A47C 29/003 | |
| | | | 135/124 | |
| D734,491 S * | 7/2015 | Krymov | D25/16 | |
| 2003/0205055 A1 * | 11/2003 | Shahbaz | F24F 3/14 | |
| | | | 62/331 | |
| 2008/0005974 A1 * | 1/2008 | Delgado Vazquez | E04H 1/125 | |
| | | | 52/36.1 | |
| 2010/0043309 A1 * | 2/2010 | Martin | E03C 1/01 | |
| | | | 52/79.5 | |
| 2010/0083586 A1 * | 4/2010 | Page | E04H 15/22 | |
| | | | 52/2.11 | |
| 2012/0037196 A1 * | 2/2012 | McDaniel, Jr. | E04H 1/1205 | |
| | | | 135/96 | |
| 2015/0152636 A1 * | 6/2015 | Connell | E04B 1/94 | |
| | | | 52/79.1 | |

\* cited by examiner

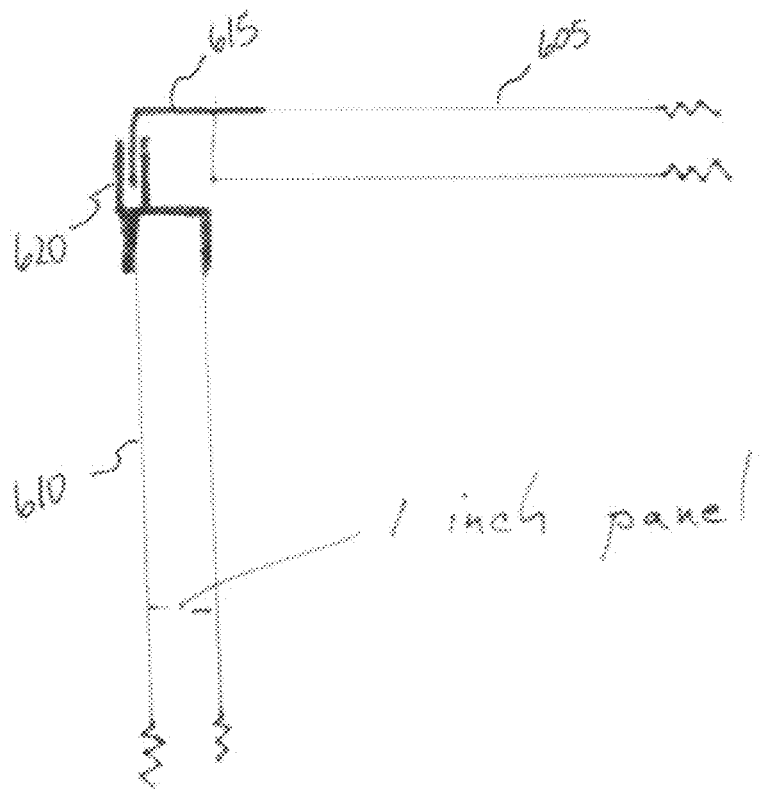
Fig. 6A
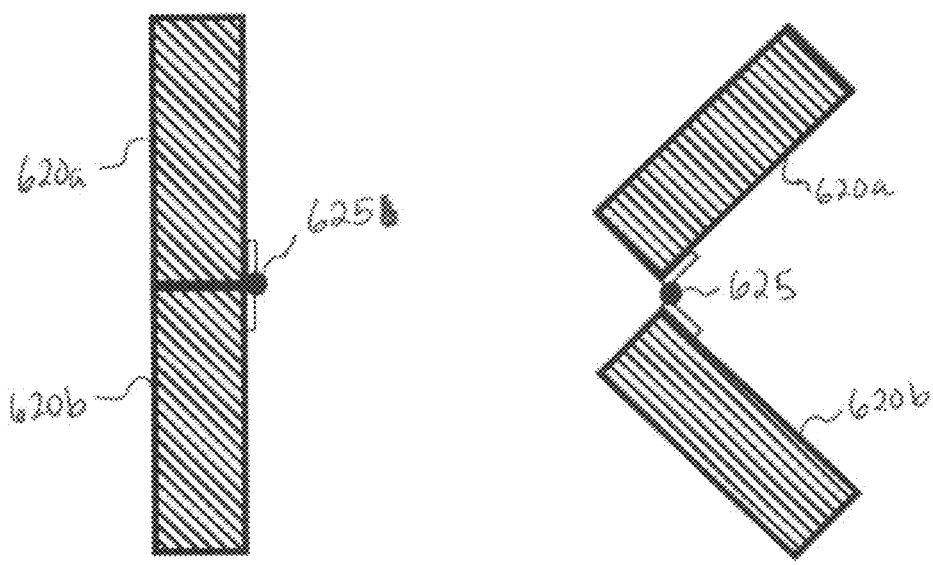
Fig. 6B
Fig. 6C

UNITARY CONSTRUCTION MICRO CAMPER WITH INTEGRATED CLIMATE CONTROL SYSTEM

CROSS-REFERENCE TO RELATED APPLICATIONS

This application claims the benefit of U.S. Provisional Application Ser. No. 62/051,056, titled "Modular Micro Camper with Integrated Climate Control System," filed by Reinking, F., on Sep. 16, 2014.

This application incorporates the entire contents of the foregoing application(s) herein by reference.

TECHNICAL FIELD

Various embodiments relate generally to micro campers formed of unitary body construction configured for integrated climate control systems, including, for example, an evaporative cooler.

BACKGROUND

Camping is a popular recreational activity. One way to camp is to use a tent made of fabric, such as nylon for example. A zipper may traverse the opening of a door or a window in the sides of a nylon tent. Such tents can be folded and stowed in very compact bundles that can be easily carried on a backpack.

Some campers may prefer a more substantial housing, so they may choose to employ recreational vehicles (RVs) configured with amenities while camping. Such RVs can provide more comforts, such as beds, running water or even air conditioning. RVs come in various forms, some of which are self-propelled, and others are configured to be towed by another vehicle.

Amenities that provide such comforts often require resources that may be unavailable or in limited supply in many camping locations. For example, many camp sites lack running water and/or electricity. To a limited degree, campers may employ batteries with solar charging.

SUMMARY

Apparatus and associated methods relate to a unitary cabin body having a utility compartment and a laterally adjacent personal compartment, the utility compartment forming a water reservoir in controlled, gravity-fed fluid communication with a climate control compartment, and a laterally directed outlet providing fluid communication from the climate control compartment to the personal compartment. In an illustrative example, the climate control compartment may be integrally formed to provide an evaporative cooling compartment and a plenum compartment. A float valve may regulate fluid communication from the water reservoir to the evaporative cooling compartment, for example. In various embodiments, a unitary roof body may engage the unitary cabin body in a stowed mode for transport, for example, and be raised above the unitary body in a deployed mode for occupancy.

Various embodiments may achieve one or more advantages. For example, some embodiments may advantageously provide highly energy efficient evaporative cooling, which may extend the battery life substantially. Various examples may provide integrated compartments formed in a unitary body constructed base for maximum cost effectiveness, space savings, and aesthetics. Improved look and clean feel may result from having a dedicated arrangement of compartments, which may substantially eliminate, for example, the need for some tubing because conduits may be simply drilled through the construction. Some systems may advantageously provide evaporative cooling to supply cooled airflow to an occupant in the personal compartment while consuming electricity at a rate that is less than output power of a renewable energy source, such as a solar panel mounted on the roof of the camper. This low power consumption technology of evaporative cooling may advantageously improve battery life, for example, and free up capacity for additional electronic loads (e.g., WiFi station). Some embodiments may substantially provide a more comfortable, refreshing atmosphere for sleeping in the personal cabin, for example, by providing an efficient, temperature reduced air flow, which may be advantageously directed near the top of the occupants' heads for maximum perceived cooling effect. Some embodiments may provide integrated evaporative cooling system with a laterally directed airflow. Such embodiments may provide improved protection against the ingress of water, for example, through an aperture in the roof or cover. An internal, integrally formed evaporative cooling system that is laterally adjacent the personal cabin compartment permits the unitary cover to have no apertures in the horizontal surface, thereby eliminating the potential of leaking or dripping water during rain storms through a gap in the seal. Furthermore, various embodiments may provide collapsible panel walls that may be kicked out to provide emergency egress, but are so constructed to resist collapsing due to lateral pressure from the outside. During assembly, panels that may be stowed in the personal cabin compartment may be quickly erected and installed between peripheral mating channels formed in the unitary construction of the base and the unitary construction of the cover. While assembled, vertical downward tension may pull down on the unitary cover to maintain upper panels in aligned engagement with lower panels. For disassembly, the tension may be readily released by raising the unitary cover, and folding the side panels along their hinge axes, and stowing them in the personal cabin compartment for convenient transport.

Various embodiments may further advantageously promote effective cooling at high energy efficiency using battery power or solar power by, for example, directing cool, moist airflow to the top of a person's head while sleeping on a mattress in the personal cabin compartment. Cool airflow directed to the top of a person's head may advantageously provide an enhanced perception of cooling effect on the entire body. As the air is warmed, it may tend to rise, where the exhaust port may provide laterally directed exhaust path for warm exhaust air to passively escape the cabin. The unitary cover surrounds the exhaust port on its top and sides, which may advantageously shield the exhaust port against ingress of rain or snow or direct sunlight into the personal cabin compartment.

The details of various embodiments are set forth in the accompanying drawings and the description below. Other features and advantages will be apparent from the description and drawings, and from the claims.

BRIEF DESCRIPTION OF THE DRAWINGS

FIGS. 6A-6C depict top and cross-sectional views of an exemplary side panel construction for the deployed mode of the MMCICCS.

Like reference symbols in the various drawings indicate like elements.

DETAILED DESCRIPTION OF ILLUSTRATIVE EMBODIMENTS

Figure 1A:
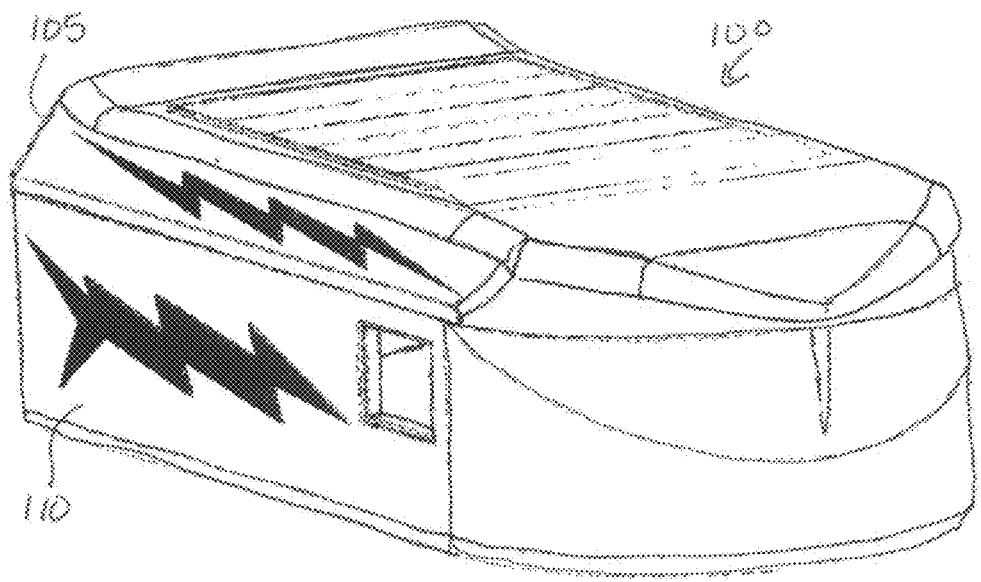
FIGS. 1A-1B depict perspective and exploded perspective views of an exemplary Modular Mini-Camper with Integrated Climate Control System (MMCICCS).
Figure 1B:
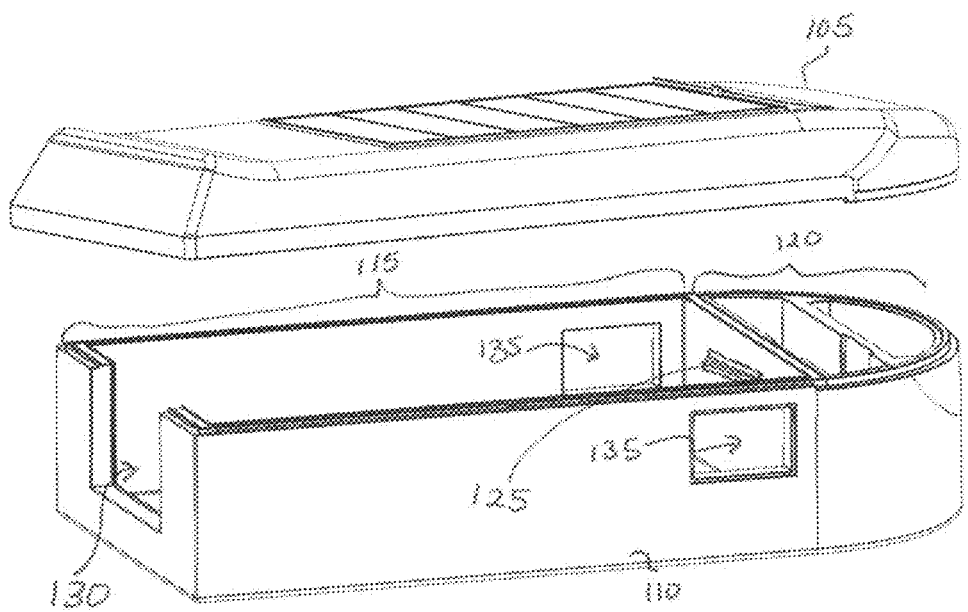

FIGS. 1A-1B depict perspective and exploded perspective views of an exemplary Modular Mini-Camper with Integrated Climate Control System (MMCICCS). As depicted, a MMCICCS 100 includes a unitary cover 105 in a sealing engagement with a unitary base 110. The unitary cover 105 and the unitary base 110 may each be formed from a rotomold process. In some embodiments, substantial thermal insulation may be filled into the open cavity within the rotomolded unitary base 110, and/or the unitary cover 105.

FIG. 1B further depicts an exploded perspective view of an exemplary MMCICCS. As depicted, the unitary cover 105 is lifted off the unitary base 110. The unitary base 110 includes a personal cabin compartment 115 laterally adjacent to a utility compartment 120. The personal cabin compartment 115 and the utility compartment 120 are formed from a single unitary body construction of the unitary base 110. A divider wall separates the personal cabin compartment 115 and the utility compartment 120. The divider wall includes a vent port 125 through which the integrated climate control system located in the utility compartment 120 injects climate controlled airflow into the chamber within the personal cabin compartment 115. The vent port 125 is opposite an access door 130 through which a user may enter the personal cabin compartment 115. In operation, the access door 130 defines an opening that would receive a hinged door, for example, to provide a productive sealed enclosure to the opening formed by the access door 130. As depicted, the personal cabin compartment 115 further includes opposing windows 135 on the lateral side walls extending between the divider wall and the access door 130. In operation, the unitary cover 105 may be engaged directly onto the unitary base 110 in a stowage mode suitable for transport such as when towed behind a motorized vehicle (e.g., car or truck). When towed behind a motorized vehicle, the MMCICCS 100 may mount on a frame with at least one axle having a plurality of wheels (not shown) for efficient mobility.

In some embodiments, the opposing windows 135 may include screens and slidable Plexiglas to control the open area of the windows 135. In other embodiments, the MMCICCS 100 may include no windows or a single window in different locations. In various embodiments the MMCICCS 100 may be releasably coupled to a trailer system for easier mobility.

Figure 2A:
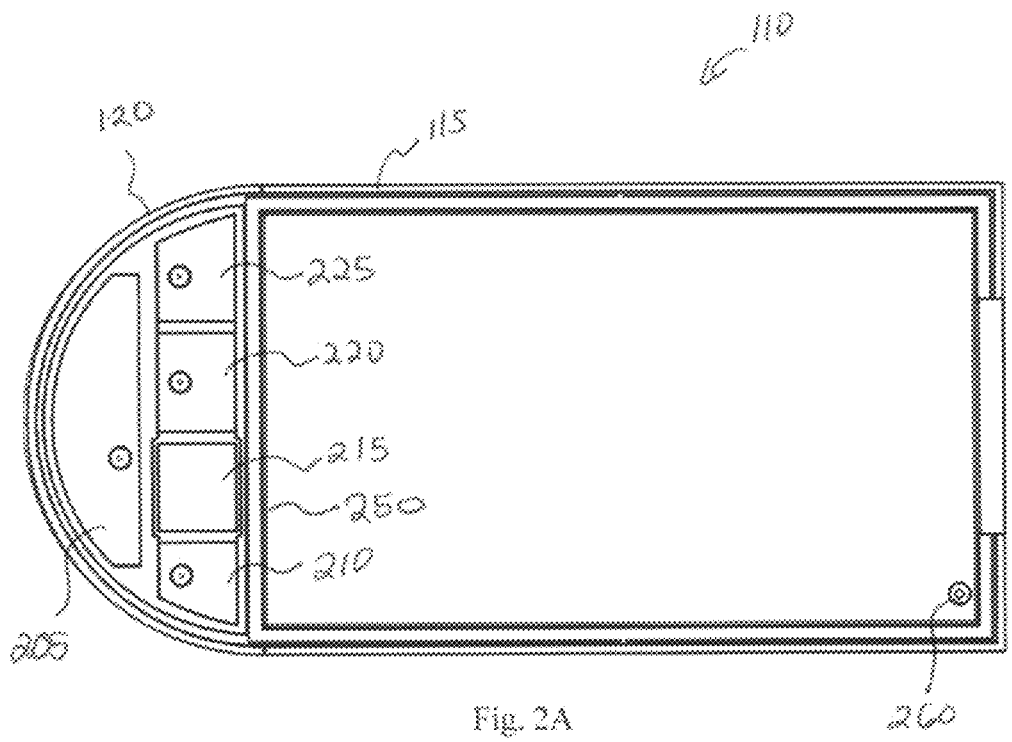
FIGS. 2A-2B depict top plan views of an exemplary unitary base and a utility compartment cover plate.
Figure 2B:
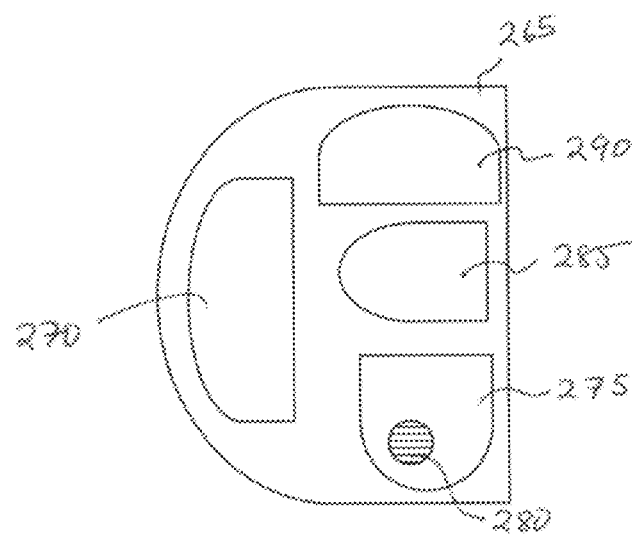

FIGS. 2A-2B depict top plan views of an exemplary unitary base and a utility compartment cover plate. The utility compartment 120 includes water reservoir 205 to store water for use with the cooling system. The utility compartment 120 includes a plenum intake chamber 210 to receive air. The utility compartment 120 includes an evaporative cooling chamber 215. The utility compartment 120 includes a battery compartment 220. The utility compartment 120 further includes a control center compartment 225 to receive electronics for operating one or more electrical systems, such as, for example, the evaporative cooling system, radios, cabin lighting, external lighting (e.g., traffic signal lighting), networking equipment (e.g., cellular communication, Wi-Fi, Bluetooth), or the like. A battery system disposed in the battery compartment may supply power to operate the blower in the evaporative cooling system, and any electrical loads in the utility compartment 120. The battery system may be recharged by a charger controller that can be plugged in to line power (e.g., 120 Volt AC), or in operative connection with a solar charging supply system, which may be installed on the unitary cover 105.

As depicted, the personal cabin compartment 115 includes a drain port 260. The drain port 260 permits gravitational forces to flush water out of the personal cabin compartment 115 in the event of water accumulation within the personal cabin compartment 115. Similarly, drains are depicted in the water reservoir 205, the plenum intake chamber 210, the battery compartment 220, and the control center compartment 225. The evaporative cooling chamber 215 is formed to contain a volume of water for operation of the evaporative cooling unit (not shown). In operation, water filled into the water reservoir 205 may be communicated (e.g., gravity fed) into the evaporative cooling chamber 215. Air may be drawn into the plenum chamber 210 from which the plenum intake chamber 210 may drive (e.g., by axial fans) air into the evaporative cooling chamber 215. The evaporative cooling chamber may include membranes (not shown) arranged so that the air received from the plenum intake chamber 210 passes through the membranes (e.g., cloth). The membranes may moisten by wicking up the water contained in the evaporative cooling chamber 215 as the air received from the plenum intake chamber 210 passes through the membranes. As the air passes through the moistened membranes, the evaporative action of the water cools the air. The cooled air is then directed through a bulkhead 250 into the personal cabin compartment 115. An example will be described in greater detail with reference to FIG. 7.

FIG. 2B depicts a utility compartment cover plate 265. The utility compartment cover plate 265 includes a water reservoir access panel 270 hindgedly coupled to the utility compartment cover plate 265 to provide an operator with access to water reservoir 205 (e.g., for filling the water reservoir with water or ice, for example). The utility compartment cover plate further includes an evaporative cooling access panel 275 hindgely coupled to the utility compartment cover plate 265. In the depicted example, the evaporative cooling access panel 275 includes a plenum intake filter 280. The plenum intake filter 280 may filter the air drawn into the plenum intake chamber 210. The evaporative cooling access panel 275 may further permit an operator access to the plenum intake chamber 210 and the evaporative cooling chamber 215 for maintenance, for example.

The utility compartment cover plate 265 further includes a battery access panel 285 and a control center access panel 290, each hindgedly coupled to utility compartment cover plate 265 to grant access, respectively, to the battery compartment 220 and the control center compartment 225. In some embodiments, a unitary access panel may provide access to different combinations of chambers and compartments at once.

Figure 3:
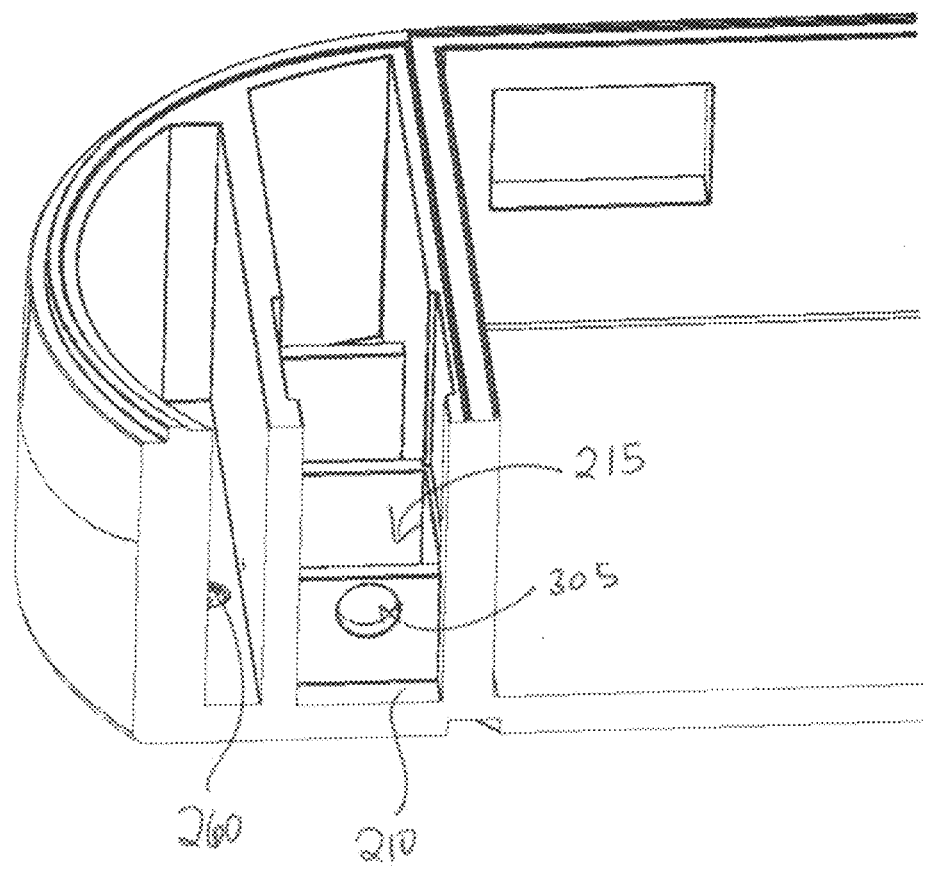
FIG. 3 depicts a side cross-section view of an exemplary utility compartment showing details of the intake plenum compartment.

FIG. 3 depicts a side cross-section view of an exemplary utility compartment showing details of the intake plenum compartment. As depicted, the plenum intake chamber 210 is separated from the evaporative cooling chamber 215 by a wall formed in the structure of the unitary base 110. The wall separating the evaporative cooling chamber 215 and the plenum intake chamber 210 includes a plenum outlet 305. The plenum intake chamber 210 is in fluid communication with the evaporative cooling chamber 215 through a plenum outlet 305. In operation, at least one battery powered fan (not shown) drives air from the plenum intake chamber 210 through the plenum outlet 305 into the evaporative cooling chamber 215 to promote airflow that may yield evaporative cooling.

Figure 4:
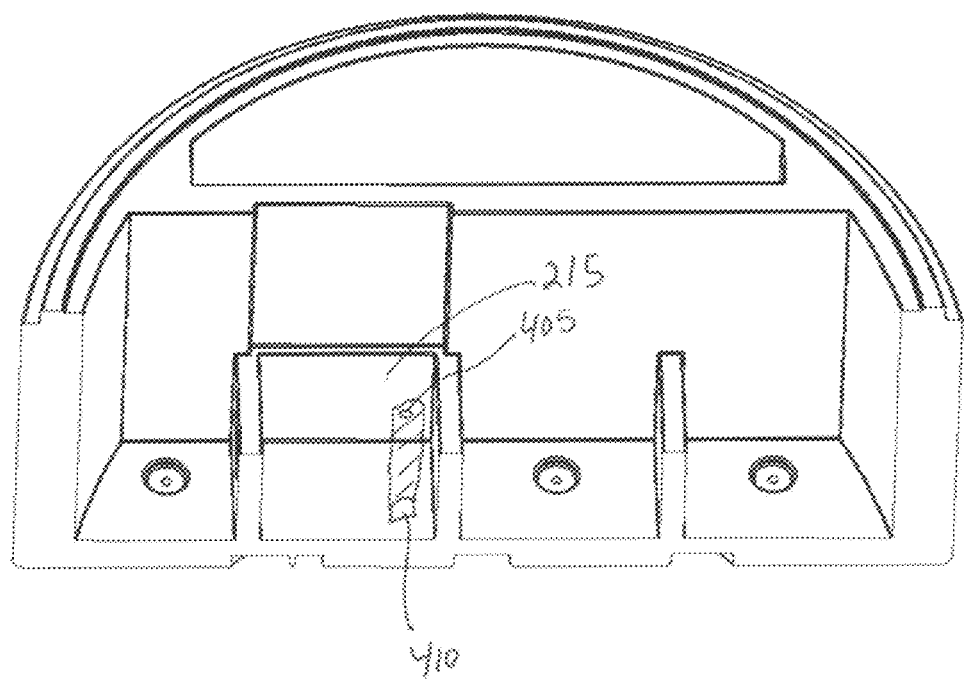
FIG. 4 depicts a rear cross-section view of an exemplary utility compartment showing details of the evaporative cooling compartment.

FIG. 4 depicts a rear cross-section view of an exemplary utility compartment showing details of the evaporative cooling compartment. In the depicted embodiment, the evaporative cooling chamber 215 includes a reservoir aperture 405 providing fluid communication from the water reservoir 205 to the evaporative cooling chamber 215 to maintain a volume of water in the evaporative cooling chamber 215. The evaporative cooling chamber 215 further includes a float valve module 410 that controllably regulates the flow of water from the water reservoir 205 to the evaporative cooling chamber 215. In operation, the membranes (not shown) may wick the water from the evaporative cooling chamber 215 as air passes from the plenum intake chamber 205 into the evaporative cooling chamber 215. As a consequence of the membranes wicking the water, the level of water may lessen in the evaporative cooling chamber 215 while the air passing into the evaporative cooling chamber 215 may cool. When the minimum level of water is not present, the float valve module 410 may permit the flow of water to maintain a minimum level of water in the evaporative cooling chamber 215. When the minimum level of water is present, the float valve module 410 may prohibit the flow of water into the evaporative cooling chamber 215.

Figure 5A:
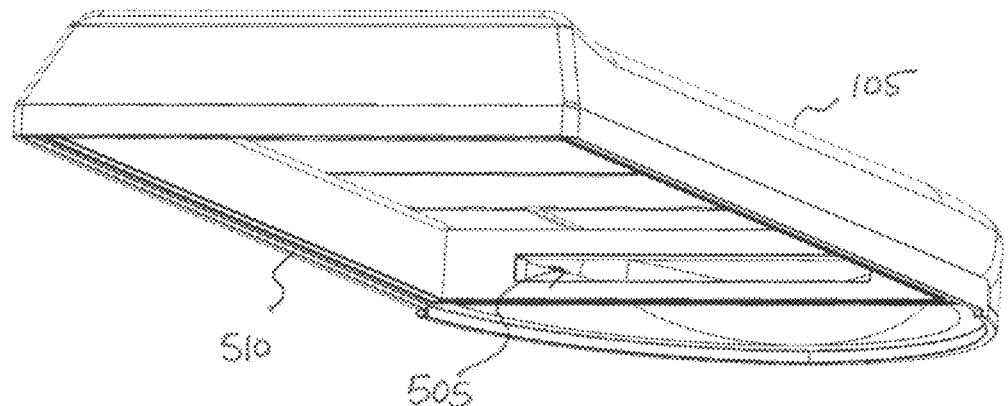
FIGS. 5A-5B depict perspective and cross-sectional views of an exemplary unitary cover and its interface with the unitary construction base.
Figure 5B:
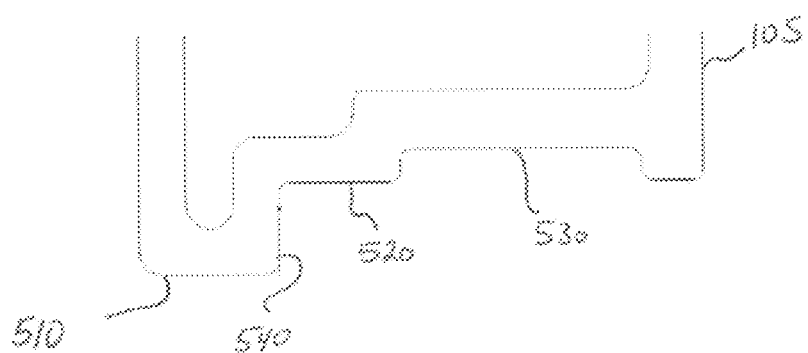
Figure 5B:
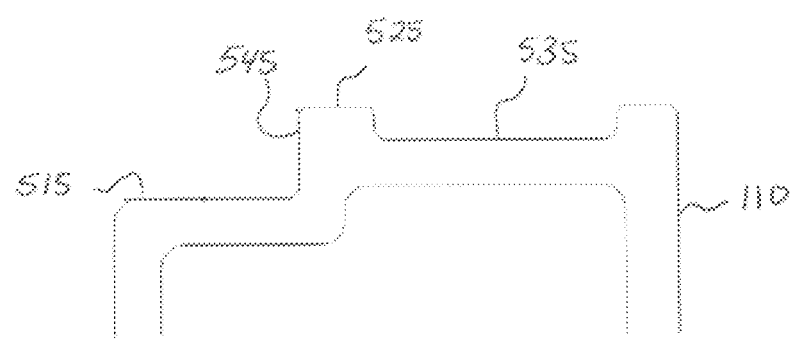

FIGS. 5A-5B depict perspective and cross-sectional views of an exemplary unitary cover and its interface with the unitary construction base. As depicted in FIG. 5A, the unitary cover 150 includes a personal cabin exhaust port 505 that permits air to escape from the personal cabin compartment 115. The personal cabin exhaust port 505 may include screens to prevent ingress of insects, for example. In some embodiments, the personal cabin exhaust port 505 may include a slidable translucent (e.g., Plexiglas) panel to control the area of the personal cabin exhaust port 505 that is open to communicate exhaust airflow from the insider the personal cabin compartment 115 to ambient external atmosphere.

The unitary cover 105 further includes a cover peripheral mating surface 510 around the periphery of the surface that engages the mating surface of the unitary base 110 to facilitate transportation in a secure manner.

FIG. 5B depicts the cover peripheral mating surface 510 and the corresponding surface mating surface 515 of the unitary base 110. The unitary cover 105 includes a plateau surface 520 and a vertical ridge 540. The unitary base 110 includes a raised plateau 525 and a vertical ridge 545. When in transport mode, the plateau surface 520 rests and mates against the raised plateau 525. The unitary cover 105 includes a trench region 530. The unitary base 110 includes a trench region 535 corresponding to trench region 530. The trench regions 530, 535 may be arranged to receive panels to form side walls when the unitary cover 105 is raised from the unitary base 110. An exemplary embodiment of suitable panels are described in further detail with reference to FIGS. 6A-6C.

In operation, the unitary cover 105 is pulled in tension towards the unitary base 110 to secure the panels when in deployed mode. In transportation mode, the cover peripheral mating surface 510 is directly engaged with corresponding mating surface 515 where the vertical ridge 540 engages the vertical ridge 545 to prevent the unitary cover from being laterally displaced and sliding off from the unitary base 110.

FIGS. 6A-6C depict top and cross-sectional views of an exemplary side panel construction for the deployed mode of the MMCICCS. FIG. 6A depicts a rear panel 605 adjacent the access door 130. The panel 605 may also be a panel on the bulkhead 250. The rear panel 605 includes an angled guide 615 to fit into a corresponding channel guide 620. The corresponding channel guide 620 extends from a side panel 610. The corresponding channel guide 620 includes a larger C-channel to receive the panel 610 and a smaller C-channel to receive the angled guide 615. When engaged, the angled guide 615 engages in an interlocking manner with channel guide 620.

FIG. 6B depicts a top panel 620a and a bottom panel 620b. As depicted in FIG. 5B, when in deployed mode, the cover peripheral mating surface 510 and the corresponding mating surface 515 secure the panels 620a, 620b in a vertically erect position. The trench region 530 receives the top panel 620a while the trench region 535 receives the bottom panel 620b. The tension between the cover peripheral mating surface 510 and the corresponding mating surface 515 may cause the top panel 620a and the bottom panel 620b to form a wall. A flexible hinge 625 on an interior-facing side of the panels 620a, 620b connects the top panel 620a and the bottom panel 620b.

FIG. 6C depicts the top panel 620a and 620b in a collapsed position. An operator may provide enough force (e.g., kick) along the inner surface of the panels 620a, 620b to cause the panels 620a, 620b to buckle outward at the hinge points, to permit the operator to safely and promptly exit from the personal cabin compartment 115. The flexible hinge 625 prevents a similar external force directed into the personal cabin compartment 115 from collapsing the panels 620a, 620b when that force is applied to the outer facing surfaces of the panels 620a, 620b.

Figure 7:
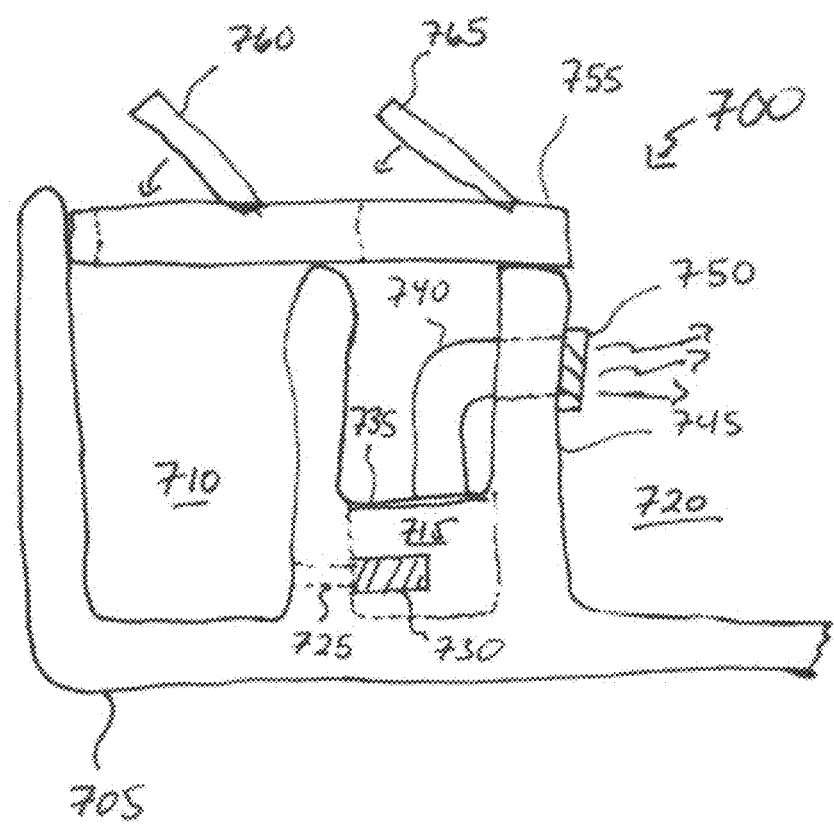
FIG. 7 depicts a side cross-section view of an exemplary utility compartment showing details of the evaporative cooling compartment and delivery of cooled airflow horizontally through the register.

FIG. 7 depicts a side cross-section view of an exemplary utility compartment showing details of the evaporative cooling compartment and delivery of cooled airflow horizontally through a register. As depicted, the unitary base 700 with integrated climate control provides a unitary body construction that integrally forms to provide to an integrated climate control system located in the utility compartment 705. The integrated climate control system formed in the utility compartment 705 includes a water reservoir 710, an evaporative cooling chamber 715, and a personal cabin compartment 720. An insulated wall integrally formed in the unitary construction of the unitary base 705 separates the water reservoir 710 and the evaporative cooling chamber 715. A conduit aperture 725 located in the wall separating the water reservoir 710 and the evaporative cooling chamber 715 provides fluid communication from the water reservoir 710 to the evaporative cooling chamber 715. The evaporative cooling chamber 715 includes a water level control device 730 (e.g., float valve) that controls the water flow from the water reservoir 710 to the evaporative cooling chamber 715. Air forced in from a laterally adjacent plenum flows across vertically positioned moistened membranes (not shown) that wick up the water. The evaporatively cooled airflow exits the evaporative cooling chamber 715 and flows to an airflow conduit 740 passing through a cover lid 735 that encloses the evaporative cooling chamber 715. The air flow continues through the airflow conduit 740 into a bulkhead 745 to be distributed in an initially laterally (e.g., horizontally) direction into the personal cabin compartment 720 where an operator may be resting.

In some embodiments, an operator may control the direction of the airflow or restrict the airflow into the personal cabin compartment 720 from the bulkhead 745 by a register 750 included in the bulkhead 745. In some embodiments, the operator may have access to a speed control user interface to control the speed of the blower in the plenum. By controlling the blower speed in the plenum, the operator can control the airflow rate into the personal cabin compartment 720.

A cover plate 755 covers the utility compartment 705. The cover plate 755 includes a water reservoir access panel 760 to provide operator access to the water reservoir 710, and an evaporative cooling access panel 765 to provide operator access to the evaporative cooling compartment 715.

Although various embodiments have been described with reference to the Figures, other embodiments are possible. For example, an electronic control panel may be located in the inner surfaces of the personal cabin compartment 115 to control the airflow of integrated climate control system 700. In another embodiment, audio and video technology may be included in the MMCICCS 100 for entertainment purposes. For example, a set of speakers may be included in the unitary base 110 while an LCD is included on the unitary cover 105. The MMCICCS 100 may include audio and video interfaces connections to connect audio/video devices such as a smartphones or tablets, for example. In some embodiments, the inner-facing ceiling surface of the unitary cover 105 includes a mounting system for mounting and maneuvering a video device such as a flat-panel monitor, for example. The mounting system may be hingedly connected to the inner-facing ceiling surface of the unitary cover 105.

In some embodiments, the MMCICCS 100 may include an actuator system to lift the unitary cover 105 from the unitary base 110. The actuator system may be a mechanical actuator system such as a screw-type actuator, for example. In another example, a screw-type actuator system may lift the unitary cover 105 from the unitary base 110 to length doubling the length of the screw.

In other embodiments, the MMCICCS 100 may include solar panels on the outer surface to recharge a battery positioned in the battery compartment. In other embodiments, the MMCICCS 100 may include an electrical outlet to power or charge an electrical device. In yet another embodiment, the personal cabin compartment 115 includes an LED lighting system to illuminate the inside of the personal cabin compartment 115.

The integrated climate control system 700 may include wireless technology such that an operator may control the integrated climate control system 700 via a mobile device such as a smartphone, for example. The wireless technology may be used to control other systems, if present, such as the actuator system, for example. In other embodiments, the MMCICCS 100 may include a Wi-Fi repeater such that the MMCICCS 100 may act as a network hotspot.

In other embodiments the unitary base 110 may include mounting devices to secure the MMCICCS 100 to a transport device, such as a trailer.

In one exemplary aspect, an apparatus includes a cabin body formed in unitary body construction and defining a utility compartment and a personal compartment laterally adjacent to the utility compartment. The apparatus includes a bulkhead formed in the unitary body and separating the utility compartment from the personal compartment, and a climate control compartment formed in the utility compartment for operating an evaporative cooler. A water reservoir is formed in the utility compartment for containing a supply of water for extended operation of the evaporative cooler. A conduit is formed in utility compartment to define gravity-fed fluid communication to the climate control compartment. A laterally directed outlet provides fluid communication from the climate control compartment to the personal compartment for airflow exiting in the climate control compartment.

In some embodiments, a float valve may be configured to regulate fluid communication from the water reservoir to the evaporative cooling compartment via the conduit.

In some embodiments, the unitary body construction of the cabin body is formed by a rotomold process, and/or the unitary body contrustion of the cabin body comprises a substantially hollow core. The apparatus may further include insulative filler dispersed substantially throughout the substantially hollow core. The climate control compartment further may include a plenum compartment and an evaporative cooling compartment laterally adjacent from each other and separated by a dividing wall formed in the unitary body construction. The apparatus may further include an air flow module operable to induce forced air flow from the plenum compartment into the evaporative cooling compartment, and may further have an aperture defined through the dividing wall formed in the air flow module. The aperture may provide a fluid communication path between the plenum compartment and the evaporative cooling compartment. The apparatus may have a register mounted to the bulkhead and oriented to direct airflow from the aperture into the personal compartment in a substantially horizontal direction.

The apparatus may have a battery compartment formed in the utility compartment and laterally adjacent to at least one of the evaporative cooling compartment and the plenum compartment.

The apparatus may further include a cover formed in a unitary construction. The unitary cover may be configured to sealingly engage a peripheral mating surface of the cabin body in a stowed mode, and further configured to compress a set of peripheral side wall panels against the peripheral mating surface of the cabin body while engaged to form sidewalls in a deployed mode.

In another exemplary aspect, an apparatus includes a cabin body formed in unitary body construction and defining a utility compartment and a personal compartment laterally adjacent to the utility compartment. A bulkhead is formed in the unitary body and separates the utility compartment from the personal compartment. A climate control compartment is formed in the utility compartment for operating an evaporative cooler. A water reservoir is formed in the utility compartment for containing a supply of water for extended operation of the evaporative cooler. A conduit is formed in the utility compartment to define gravity-fed fluid communication to the climate control compartment. A laterally directed outlet provides fluid communication from the climate control compartment to the personal compartment for airflow exiting in the climate control compartment. The unitary body construction of the cabin body is formed by a rotomold process. The unitary body construction of the cabin body comprises a substantially hollow core. An insulative filler is dispersed substantially throughout the substantially hollow core.

In some embodiments, the apparatus may include a plurality of peripheral side wall panel pairs. Each pair may have an upper panel and a lower panel. In each pair, the lower panel may be hingedly coupled along an interior horizontal edge to an interior horizontal edge of the upper panel.

The apparatus may include a cover configured to sealingly engage a peripheral mating surface of the cabin body in a stowed mode, and further configured to compress the plurality of pairs of peripheral side wall panels against the peripheral mating surface of the cabin body while engaged to form sidewalls in a deployed mode.

The unitary body construction of the cabin body may be formed by a rotomold process, wherein the unitary body construction of the cabin body comprises a substantially hollow core. An insulative filler is dispersed substantially throughout the substantially hollow core, and at least one of the pairs of panels, while in the deployed mode, may be configured to collapse outward in response to an outward directed kick from an occupant inside the personal compartment. The outward directed kick, or other sufficient force, may overcome the structural forces of compression that maintain the upper and lower panels in an aligned, stacked, erect state in the deployed mode, to form a substantially erect peripheral side wall enclosing a chamber to be occupied by one or two operators, for example, lying a mattress in the personal cabin compartment.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are within the scope of the following claims.

What is claimed is:

1. An apparatus comprising:
    a cabin body of unitary one-piece body construction and defining a utility compartment and a personal compartment laterally adjacent to the utility compartment;
    a bulkhead formed in the unitary body and separating the utility compartment from the personal compartment;
    a climate control compartment formed in the utility compartment for operating an evaporative cooler;
    a water reservoir formed in the utility compartment for containing a supply of water for extended operation of the evaporative cooler;
    a conduit formed in utility compartment to define gravity-fed fluid communication to the climate control compartment;
    a laterally directed outlet providing fluid communication from the climate control compartment to the personal compartment for airflow exiting in the climate control compartment;
    a cover of unitary one-piece construction, wherein, in a deployed mode, the unitary cover is configured to compress a set of peripheral side wall panels against a peripheral mating surface of the cabin body to form sidewalls; and
    wherein, in the deployed mode, the personal compartment is configured for occupancy by an occupant.

2. The apparatus of claim 1, wherein, in a stowed mode, the unitary cover is configured to sealingly engage the peripheral mating surface of the cabin body.

3. The apparatus of claim 1, wherein the unitary body construction of the cabin body is formed by a rotomold process.

4. The apparatus of claim 1, wherein the unitary body construction of the cabin body comprises a substantially hollow core.

5. The apparatus of claim 4, further comprising insulative filler dispersed substantially throughout the substantially hollow core.

6. The apparatus of claim 1, wherein the climate control compartment further comprises a plenum compartment and an evaporative cooling compartment laterally adjacent from each other and separated by a dividing wall formed in the unitary body construction.

7. The apparatus of claim 6, further comprising an air flow module operable to induce forced air flow from the plenum compartment into the evaporative cooling compartment.

8. The apparatus of claim 7, further comprising an aperture defined through the dividing wall formed in the air flow module, the aperture providing a fluid communication path between the plenum compartment and the evaporative cooling compartment.

9. The apparatus of claim 8, further comprising a register mounted to the bulkhead and oriented to direct airflow from the aperture into the personal compartment in a substantially horizontal direction.

10. An apparatus comprising:
    a cabin body of unitary one-piece body construction and defining a utility compartment and a personal compartment laterally adjacent to the utility compartment;
    a bulkhead formed in the unitary body and separating the utility compartment from the personal compartment;
    a climate control compartment formed in the utility compartment for operating an evaporative cooler;
    a water reservoir formed in the utility compartment for containing a supply of water for extended operation of the evaporative cooler;
    a conduit formed in utility compartment to define gravity-fed fluid communication to the climate control compartment;
    a float valve configured to regulate fluid communication from the water reservoir to the evaporative cooling compartment via the conduit;
    a laterally directed outlet providing fluid communication from the climate control compartment to the personal compartment for airflow exiting in the climate control compartment;
    a cover of unitary one-piece construction, wherein, in a deployed mode, the unitary cover is configured to compress a set of peripheral side wall panels against a peripheral mating surface of the cabin body to form sidewalls; and
    wherein, in the deployed mode, the personal compartment is configured for occupancy by an occupant.

11. The apparatus of claim 10, wherein, in a stowed mode, the unitary cover is configured to sealingly engage the peripheral mating surface of the cabin body.

12. The apparatus of claim 10, further comprising a battery compartment formed in the utility compartment and laterally adjacent at least one of the evaporative cooling compartment and a plenum compartment.

13. The apparatus of claim 10, wherein the unitary body construction of the cabin body is formed by a rotomold process.

14. The apparatus of claim 10, wherein the unitary body construction of the cabin body comprises a substantially hollow core.

15. The apparatus of claim 14, further comprising insulative filler dispersed substantially throughout the substantially hollow core.

16. The apparatus of claim 10, wherein the climate control compartment further comprises a plenum compartment and an evaporative cooling compartment laterally adjacent from each other and separated by a dividing wall formed in the unitary body construction.

17. The apparatus of claim 16, further comprising an air flow module operable to induce forced air flow from the plenum compartment into the evaporative cooling compartment.

18. The apparatus of claim 17, further comprising an aperture defined through the dividing wall formed in the air flow module, the aperture providing a fluid communication path between the plenum compartment and the evaporative cooling compartment.

19. The apparatus of claim 18, further comprising a register mounted to the bulkhead and oriented to direct airflow from the aperture into the personal compartment in a substantially horizontal direction.

20. An apparatus comprising:
- a cabin body formed in unitary body construction and defining a utility compartment and a personal compartment laterally adjacent to the utility compartment;
- a bulkhead formed in the unitary body and separating the utility compartment from the personal compartment;
- a climate control compartment formed in the utility compartment for operating an evaporative cooler;
- a water reservoir formed in the utility compartment for containing a supply of water for extended operation of the evaporative cooler;
- a conduit formed in utility compartment to define gravity-fed fluid communication to the climate control compartment;
- a laterally directed outlet providing fluid communication from the climate control compartment to the personal compartment for airflow exiting the climate control compartment;
- a plurality of peripheral side wall panel pairs, each pair having an upper panel and a lower panel, wherein in each pair, the lower panel is hingedly coupled along an interior horizontal edge to an interior horizontal edge of the upper panel; and,
- a cover configured to sealingly engage a peripheral mating surface of the cabin body in a stowed mode, and further configured to compress the plurality of pairs of peripheral side wall panels against the peripheral mating surface of the cabin body while engaged to form sidewalls in a deployed mode;
- wherein the unitary body construction of the cabin body is formed by a rotomold process, wherein the unitary body construction of the cabin body comprises a substantially hollow core, and an insulative filler is dispersed substantially throughout the substantially hollow core, and at least one of the pairs of panels, while in the deployed mode, is configured to collapse outward in response to an outward directed kick from an occupant inside the personal compartment.

* * * * *